United States Patent Office 2,786,059
Patented Mar. 19, 1957

2,786,059

DERIVATIVES OF 2-N-METHYL-1,2,3,4-TETRAHYDRO-GAMMA-CARBOLINES

Ulrich Hörlein, Wuppertal-Vohwinkel, Germany, assignor to Schenley Industries, Inc., New York, N. Y., a corporation of Delaware No Drawing. Application February 18, 1954,
Serial No. 411,263

Claims priority, application Germany April 30, 1951

6 Claims. (Cl. 260—296)

The present invention relates in general to the synthesis of novel organic chemical compounds. More particularly, the invention contemplates the provision of novel derivatives of gamma carbolines substituted at the 5-nitrogen atom, and to processes for preparing such compounds.

The compounds of the present invention are characterized, in particular, by their prolonged antihistaminic activity. The use of antihistamines in the treatment of diseases of allergic origin is now widespread and a relatively large number of effective drugs are available for this purpose. It has been found that the individual response of patients to antihistamine therapy often varies and many known antihistamine have been found to produce certain undesirable side effects which customarily appear clinically in such manifestations as drowsiness, vertigo, headaches, excitement and gastrointestinal disturbances. A truly effective antihistamine therefore, should be relatively free of these undesirable side effects and should also be characterized by low toxicity in general, high tolerability of dosage and sustained or prolonged effectiveness. It has been found by virtue of tests conducted to date on animals and in clinical testing on humans, that certain of the compounds of the general group herein described meet these requirements.

It is known that 2-N-methyl-1,2,3,4-tetrahydro-γ-carbolines can be obtained by reacting phenylhydrazine hydrochloride and 1-N-methyl-4-piperidone, and that the reaction proceeds through the formation of 1-methyl-4-piperidone phenylhydrazone. The latter is digested on the steam bath with aqueous sulfuric acid to yield the substituted γ-carboline, in accordance with the following reaction:

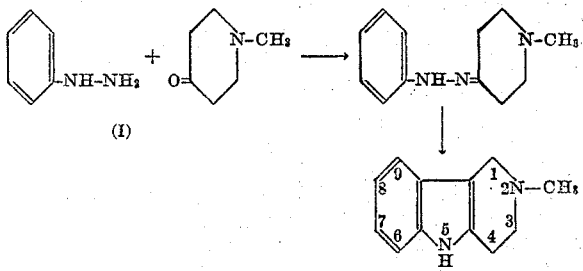

(J. Chem. Soc., London, 1945, pages 401–402—Cook et al.)

I have found that gamma tetrahdyrocarbolines, substituted at the bridge nitrogen atom connecting the phenyl and piperidine rings (the 5 nitrogen atom), can be prepared by methods hereinafter described, and that the compounds thus produced are effective antihistamines.

The compounds of the invention may be represented by the following general formula:

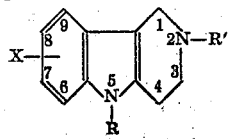

in which X is (A) hydrogen or (B) hydrogen and a halogen atom in at least one position, R is an alkyl, alkylaminoalkyl, aralkyl, monoheterocyclic aralkyl, monohomocyclic aryl or monoheterocyclic aryl group, and R' is of the group consisting of hydrogen and lower alkyl radicals.

The compounds of the invention may be prepared by various syntheses. They can be obtained by the reaction of alpha-substituted phenylhydrazines with salts of 1-N-alkyl-4-piperidones in aqueous or alcoholic mineral acid media. For example, synthesis of a typical class of compounds of the invention may be carried out by reacting benzylphenylhydrazine of the general formula:

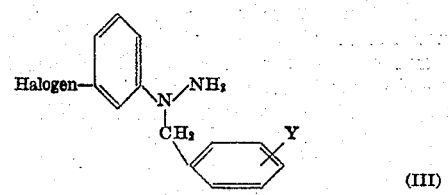

(III)

wherein Y is hydrogen or a halogen atom, with 1-N-alkyl-4-piperidones. During this reaction the following two isomeric compounds are generally formed simultaneously:

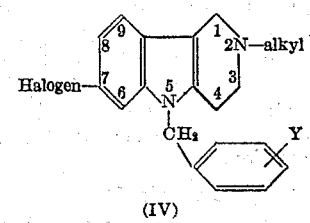

(IV)

and

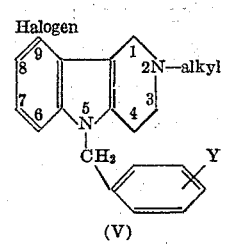

(V)

While an exact proof of the constitution of these compounds has not as yet been obtained, it is assumed for reasons of analogy that the 7-halogen compounds of Formula IV above are produced in a predominant amount.

It is also possible to replace the active hydrogen atom at the 5-imino-nitrogen atom of the gamma carboline with an atom of a metal such as sodium, potassium or lithium, or with the Grignard magnesium bromide radical (—MgBr) and to subsequently react the resulting compound with an alkyl, aminoalkyl, aryl, or aralkyl halide or a reactive ester of the selected alcohols and phenols corresponding to the substituent group that it is desired to introduce. Thus, certain typical compounds of the invention can be produced by reacting alkali-metal compounds of tetrahydro-γ-carbolines of the formulae:

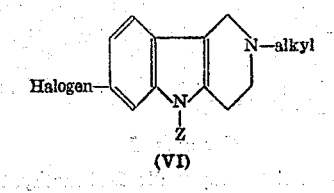

(VI)

and

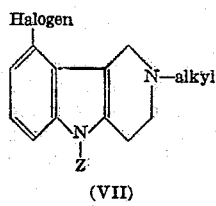

(VII)

wherein Z is an alkali metal, with reactive esters of the formula:

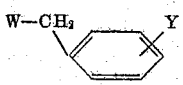

(VIII)

in which W represents the reactive ester group and Y is as defined with respect to Formula III above.

The fact that certain of the compounds of the invention, such, for example, as 2-N-methyl-5-N-benzyl-1,2,3,4-tetrahydro-γ-carboline and 2-N methyl-7-chloro-5-N-benzyl-1,2,3,4-tetrahydro-γ-carboline, have been found to possess prolonged antihistaminic activity is not to be expected since the 2-N-methyl-1,2,3,4-tetrahydro-γ-carboline reported by Cook et al. (infra), a closely related compound, has no antihistaminic activity.

The carboline bases of the compounds of the invention are, for the greater part, distillable under high vacuum; some showing a strong tendency to crystallize. In utilization of the compounds for therapeutic purposes, they may be administered in the form of their readily crystallized common mineral or simple organic acid salts.

The following examples, which describe the preparation of specific compounds conforming to the general formula set forth above, are merely intended to be illustrative and are not to be construed as limiting the scope of the invention.

*Example 1*

Preparation of the compound: 2-N-methyl-7-chloro-5-N-benzyl-1,2,3,4-tetrahydro-γ-carboline; as represented by the following formula:

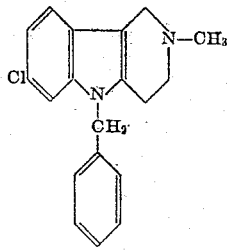

(IX)

The intermediate, N-benzyl-m-chloroaniline of boiling point 182–186° C. at 5 mm. pressure is obtained by heating 3-chloroaniline with benzyl chloride. N-benzyl-N-3-chlorophenylhydrazine of boiling point 190–195° C. at 5 mm. pressure is prepared from the intermediate by nitrosation and reduction of the nitroso compound with zinc dust and glacial acetic acid.

By reacting N-benzyl-N-3-chlorophenylhydrazine with N-methyl-4-piperidone hydrochloride in boiling alcohol saturated with hydrogen chloride, one isomer, which is probably the desired 2-N-methyl-7-chloro-5-N-benzyl-1,2,3,4-tetrahydro-γ-carboline, crystallizes as the hydrochloride from the reaction solution in a yield of about 50–55 percent. Upon recrystallizing from water the hydrochloride is found to melt at 276° C. A base is obtained by treatment with sodium hydroxide solution which, following recrystallization from ligroin, yields crystals having a melting point of 139–141° C. This base can be converted into the naphthalene-1,5-disulfonate of melting point 209–211° C.

*Example 2*

Preparation of the compound: 2-N-methyl-9-chloro-5-N-benzyl-1,2,3,4-tetrahydro-γ-carboline; as represented by the following formula:

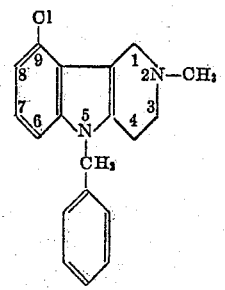

(X)

In reacting the N-benzyl-N-3-chlorophenylhydrazine with N-methyl-4-piperidone hydrochloride of Example 1, a naphthalene-1,5-disulfonate of melting point about 300° C., is obtained from the alcoholic reaction solution containing hydrogen chloride, by precipitating with a methanolic solution of naphthalene-1,5-disulfonic acid in a yield of about 10–20 percent of theoretical. The compound, upon analysis also yields values corresponding to $2C_{19}H_{19}N_2Cl \cdot C_{10}H_8O_6S_2$ and is believed to be the naphthalene-1,5-disulfonate of the 2-N-methyl-9-chloro-5-N-benzyl-1,2,3,4-tetrahydro-γ-carboline. By treatment with sodium hydroxide solution a base is obtained which, following recrystallization from ligroin, melts at 110–112° C.

*Example 3*

Preparation of the product, 2-N-methyl-5-N-benzyl-1,2,3,4-tetrahydro-γ-carboline, having the following formula:

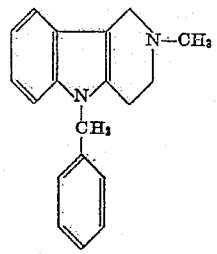

(XI)

One-tenth mole (23.4 grams) of N-phenyl-N-benzylhydrazine hydrochloride (α-benzylphenylhydrazine) and about 0.1 mole (15 grams) of 1-N-methyl-4-piperidone hydrochloride are boiled together with 250 milliliters of cold saturated alcoholic hydrochloric acid for 3 hours. After cooling, the precipitated ammonium chloride is separated by suction filtration, the filtrate is diluted with water, the alcohol is evaporated in vacuo and the residue is taken up in water. A portion of the compound may crystallize as the hydrochloride salt and may be separated at this point and purified further by recrystallization from a mixture of alcohol and ether. The remainder of the product is obtained by making the solution alkaline, extracting it with ether, drying the extract over potassium carbonate, evaporating the ether and recovering the product by distillation under high vacuum. The product, the base of the formula above set forth, has a boiling point of 207°–215° C. at a pressure of 1 millimeter of mercury. The distillate, after mulling with petroleum ether, yields a crystalline product which, following recrystallization from ligroin, yields pure crystals having a melting point of 88°–89° C. The hydrochloride salt of the base, crystallized from a mixture of alcohol and ether, has a melting point of 230° C. The total yield of product was 69% of the theoretical.

2-N-methyl-5-N-benzyl-tetrahydro-γ-carboline may also be obtained as follows: About 231 grams (1 mol) of methylimino-diethyl-dipropionate are introduced into a solution of sodium ethylate obtained by adding 23 grams of sodium to 400 cc. of absolute alcohol, and the alcohol is distilled in vacuo by heating the mixture at a temperature of 120° to 130° C. at 3 mm. pressure for a period of 2 to 3 hours. The residue is taken up in a cold mixture of 250 grams of concentrated sulfuric acid and 750 cc. of water and boiled until the evolution of carbon dioxide ceases (2 to 3 hours). After cooling, 109 grams (0.55 mol) of N-benzyl-N-phenyl hydrazine and 200 cc. of sulfuric acid (about 25 percent) are added and the mixture is boiled for a further three hours. The product base may be isolated from the reaction mixture, either in the form of a sulfate containing water of crystallization and having a melting point of 120° C. by diluting the reaction mixture with an equal volume of water and inoculating, or as the base salt of naphthalene-1,5-disulfonic acid (M. P. 280° C.) by adding an aqueous solution of 95 grams of the sodium salt of naphthalene disulfonic acid and saturating with sodium acetate. Alternatively, the base may be recovered in the manner described in the first portion of this example. The yield is about 80 to 85 percent of the theoretical, calculated on N-benzyl-N-phenyl-hydrazine.

Example 4

Preparation of the compound: 2-N-methyl-8-chloro-5-N-(para-chlorobenzyl)-1,2,3,4 - tetrahydro-γ-carboline, a compound represented by the formula:

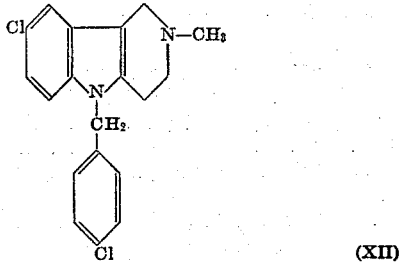

(XII)

N-p-chlorobenzyl - N-p-chlorophenylhydrazine, whose methane sulfonate (methylsulfuric acid salt) has a melting point of 201° C. with decomposition, is prepared by reduction with sodium amalgam of the Schiff's base of p-chloroaniline and p-chlorobenzaldehyde, treatment of the resulting benzyl compound with nitrous acid to produce the corresponding nitroso compound; and reduction of the resulting nitroso compound to N-p-chlorobenzyl-N-p-chlorophenylhydrazine, preferably in accordance with the method described by E. Fischer (Ann., 190, 174–8 (1878)), for the preparation of N,N-diphenylhydrazine from diphenylamine.

One-tenth mole (36.3 grams) of N-p-chlorobenzyl-N-p-chlorophenylhydrazine methane sulfonate and 15 grams (0.1 mole) of 1-N-methyl-4-piperidone hydrochloride are refluxed in 250 milliliters of ethyl alcohol saturated with hydrogen chloride. The precipitate, which forms within about 3 hours, is separated by suction filtration in the cold and is washed with alcohol. In addition to ammonium chloride, this precipitate contains the difficultly soluble hydrochloride of the desired base, which may be recovered by decomposing the hydrochloride with alkali and extraction of the base with ether. After recrystallization from ligroin, the product base has a melting point of 123°–124° C. Its methane sulfonate, precipitated with ethyl acetate and recrystallized from absolute alcohol, has a melting point of 195°–196° C. The total yield of product is approximately 72% of the theoretical.

Example 5

Preparation of the compound: 2-N-methyl-5-N-n-butyl-1,2,3,4-tetrahydro-γ-carboline, represented by the formula:

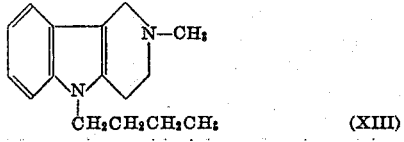

(XIII)

Fifteen (15) grams of 1-N-methyl-4-piperidone hydrochloride and 16.4 grams of N-n-butyl-N-phenylhydrazine are reacted together in 200 milliliters of alcoholic hydrochloric acid as described in Example 3 and the product base is recovered as therein described. This product has a boiling point of 196°–204° C. at a pressure of 1.5 millimeters. The maleate of the base compound, after being recrystallized from water, has a melting point of 148–149° C. The product is obtained in a yield of approximately 60% of the theoretical.

Example 6

Preparation of the compound 2-N-methyl-5-N-phenyl-1,2,3,4-tetrahydro-γ-carboline, represented by the formula:

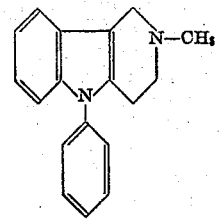

(XIV)

One-tenth mole (18.6 grams) of N,N-diphenylhydrazine is dissolved in 200 milliliters of anhydrous ethyl alcohol and gaseous hydrogen chloride is bubbled through the solution in the cold until it is saturated. Then about 0.1 mole (15 grams) of 1-N-methyl-4-piperidone hydrochloride is added and the reaction mixture is heated to boiling on the steam bath for 3 hours. After cooling, the mixture is thereafter treated as described in Example 3, to separate the by-product ammonium chloride and recover the product, which is isolated preferably in the form of the base. The base has a boiling point of 214°–225° C. at a pressure of 2 millimeters and, after mulling with petroleum ether and being recrystallized from ligroin, yields a purified product having a melting point of 101.5°–102.5° C. It is obtained in a yield of about 62% of theory.

Example 7

Preparation of 2-N-methyl-5-N-dimethylaminoethyl-1,2,3,4-tetrahydro-γ-carboline, having the formula:

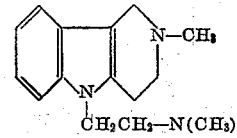

(XV)

One-tenth mole (18.6 grams) of 2-N-methyl-1,2,3,4-tetrahydro-γ-carboline, which can be obtained from phenylhydrazine hydrochloride and 1-N-methyl-4-piperidone hydrochloride, is refluxed with 4.5 grams of toluene-moistened, very finely pulverized, sodamide (NaNH₂) in xylene, with stirring. After about 1 to 2 hours, evolution of ammonia ceases and the sodium compound precipitates as a yellow white solid. Approximately 60 milliliters of a solution of 10.8 grams of dimethylaminoethyl chloride is added dropwise over a period of about a half hour and the mixture is refluxed for an additional 2 to 3 hours. The reaction mixture is cooled, the precipitated sodium chloride is separated by suction filtration, and the filtrate is extracted with dilute aqueous hydrochloric acid. The extract is made alkaline and the precipitated base is taken up in ether, dried and distilled under high vacuum, yielding a product, the base of the formula above set forth, having a boiling point of 200–205° C. at a pressure of 2.5 millimeters. The maleate of this base, which has the empirical formula C₁₆H₂₃N₂.2C₄H₄O₄, is obtainable in the usual manner and may be precipitated with acetone and recrystallized from a mixture of methanol and ether. Its melting point is 164°–165° C. The total yield of the product is approximately 70% of the theoretical.

Example 8

Preparation of the compound: 2-N-methyl-5-N-2-pyridyl-1,2,3,4-tetrahydro-γ-carboline, represented by the formula:

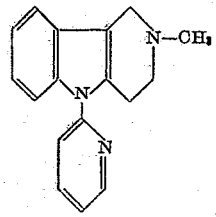

(XVI)

Eighteen grams of 1-N-methyl-4-piperidone hydrochloride and 25.8 grams of N-2-pyridyl-N-phenyl-hydrazine hydrochloride (M. P. 183° C.) are refluxed together for a period of 3 hours in 200 milliliters of hydrogen chloride-saturated alcohol. The product base of the formula above set forth is recovered as described in Example 3. It has a boiling point of 218–230° C. at a pressure of 2.5 millimeters and is obtained in a yield of about 39% of the theoretical. After recrystallization from ligroin, it is obtained as pale yellow-colored crystals, having a melting point of 116–117° C.

The N-2-pyridyl-N-phenylhydrazine starting material may be prepared from the nitroso derivative of 2-phenylamino-pyridine by reduction with zinc dust and actic acid in a manner described by Tschitschibabin and Knunjanz (Ber. 61, 2215–17 (1928).) 2-phenylamino-pyridine may be obtained by reacting aniline with 2-bromopyridine, preferably in the presence of sodamide.

Example 9

Preparation of the compound: 2-N-methyl-5-N-(p-chlorobenzyl)-1,2,3,4-tetrahydro-γ-carboline, represented by the formula:

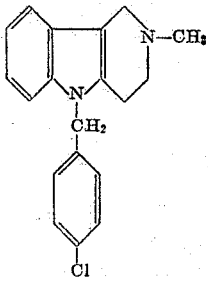

(XVII)

By procedures similar to those described in Example 4 above, p-chlorobenzaldehyde and aniline are condensed to a Schiff's base, which is then converted to N-p-chlorobenzyl-N-phenyl-hydrazine. This compound is reacted with 1-N-methyl-4-piperidone hydrochloride by a procedure analogous to that described in Example 4, to yield the product base, 2-N-methyl-5-N-p-chlorobenzyl-1,2,3,4-tetrahydro-γ-carboline. This product has a boiling point of 208°–215° C. at a pressure of 1 millimeter and, after recrystallization from ligroin, a melting point of 107° C.

Example 10

Preparation of the product: 2-N-methyl-8-chloro-9-N-(p-methoxybenzyl) - 1,2,3,4-tetrahydro-γ-carboline, represented by the formula:

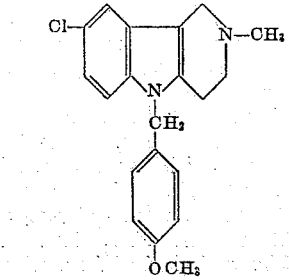

(XVIII)

In a manner analogous to that described in Examples 4 and 9 above, p-chloroaniline and anisaldehyde are condensed to a Schiff's base, which is then converted to N-(p-chlorophenyl) - N - (p - methoxybenzyl)-1,2,3,4-tetrahydro-γ-carboline. Its boiling point is 216°–225° C. at a pressure of 1.5 millimeters and its methane sulfonate has a melting point of 190–191° C.

Example 11

Preparation of the compound: 2-N-methyl-5-α-pyridylmethyl-1,2,3,4-tetrahydro-γ-carboline, represented by the formula:

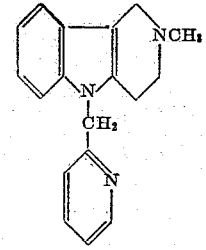

(XIX)

About 1 mole of aniline and 1 mole of α-formylpyridine are mixed, ether is added, the solution is dried with potash and distilled at a pressure of 5 mm. Hg at 140° C. The yield of the Schiff's base is nearly the theoretical.

About 170 g. of this compound are catalytically hydrogenated with Raney nickel in the usual manner. The hydrogenated product yield is about 155 g. or 90% of the theoretical. At a pressure of 8 mm. Hg, the boiling point of the resulting α-pyridylmethyl-aniline is 168–172° C.

Approximately 155 g. of this compound are dissolved in 750 cc. hydrochloric acid (10 percent) and 68 g. of sodium nitrite in 250 cc. of water is slowly added. After an hour the solution is rendered alkaline with ammonia and stirred overnight. The nitroso compound, which has then solidified, is removed, washed and reduced to N-α-pyridylmethyl-N-phenylhydrazine according to the method described by E. Fischer (Ann. 190, 174–8 (1878)). Its boiling point is 165–175° C. at a pressure of 2–3 mm. Hg and the yield is about 75% of the theoretical.

A solution of 40 g. of N-α-pyridylmethyl-N-phenyl-hydrazine in 450 cc. of absolute alcohol is saturated, in the cold, with gaseous hydrogen chloride and about 30 g. of N-methyl-4-piperdone hydrochloride is added. The solution is boiled for about three hours on the water bath, and again saturated at 0 to 10° C. with gaseous hydrogen chloride. The residue is removed, washed again with alcoholic hydrochloric acid and the residual crystalline mass of ammonium chloride and the hydrochloride of 2-N-methyl-5-α-pyridylmethyl-1,2,3,4-tetrahydro-γ-carboline is separated into its components as in the foregoing examples. The melting point of the base hydrochloride is 239–240° C., and the yield obtained is about 60 percent of the theoretical.

Example 12

Preparation of the compound: 2-N-methyl-7-chloro-5-N-(p-chlorobenzyl)1,2,3,4-tetrahydro - γ - carboline, represented by the following formula:

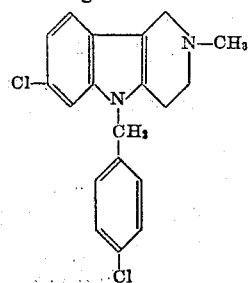

(XX)

N-p-chlorobenzyl-3-chloroaniline of boiling point 210° C. at a pressure of 5 mm. Hg, is obtained in an exothermic reaction by heating 3-chloroaniline with p-chlorobenzyl chloride. It is converted into the corresponding N-p-chlorobenzbyl - N - 3-chlorophenylhydrazine, which boils with decomposition at 218–220° C. at a pressure of 1.5 mm. Hg, by nitrosation and reduction with zinc dust and glacial acetic acid in ethanol. The crude product is preferably used for further synthesis.

Crude N-p-chlorobenzyl - N - 3-chlorophenylhydrazine, of amount 50 grams, is dissolved in 400 cc. of ethanol and the solution is saturated with hydrogen chloride. N-methyl-4-piperidone hydrochloride, of amount 30 grams, is added to the mixture and the resulting mixture is then refluxed for four hours. Upon cooling, a crystalline residue is obtained, which is filtered by suction filtration. The resulting product, apart from ammonium chloride, consists of a hydrochloride which is believed to be the hydrochloride of the desired 2-N-methyl-7-chloro-5 - N - (p - chlorobenzyl) - tetrahydro-γ-carboline. This compound may be recovered in a yield of about 55 percent of theoretical. Upon recrystallizing from water, it is found to have a melting point of 280–282° C.

*Example 13*

Preparation of the compound: 2-N-methyl-7-bromo-5-N-benzyl-1,2,3,4-tetrahydro-γ-carboline, represented by the following formula:

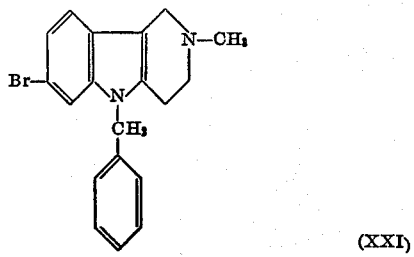

(XXI)

N-benzyl-3-bromoaniline of boiling point 160–168° C. at a pressure of 0.1 mm. Hg, is obtained by heating 3-bromoaniline and benzyl chloride to a temperature of about 120° C. It is converted into N-benzyl-N-3-bromophenylhydrazine, which boils with little decomposition at 210–220° C. at a pressure of 0.1 mm. Hg, by nitrosation and reduction of the nitroso compound with zinc dust and acetic acid in ethanol. The crude product is preferably used for further synthesis.

Crude N-benzyl-N-3-bromophenylhydrazine, of amount 33 grams, is dissolved in 400 cc. of ethanol and the solution is saturated with hydrogen chloride. To this mixture, there is added 30 grams of N-methyl-4-piperidone hydrochloride and the resulting mixture is refluxed for five hours. The hydrochloride of the desired 2-N-methyl-7-bromo-5-N-benzyl-tetrahydro-γ-carboline crystallizes from the reaction mixture in a yield of from about 40 to 45 percent of the theoretical. The hydrochloride is first converted into the corresponding base by addition of aqueous ammonia and then into the methane sulfonate of melting point 210–212° C., or the naphthalene-1,5-disulfonate of melting point 222–224° C.

*Example 14*

Preparation of the compound: 2-N-methyl-9-bromo-5-N-benzyl-1,2,3,4-tetrahydro-γ-carboline, represented by the following formula:

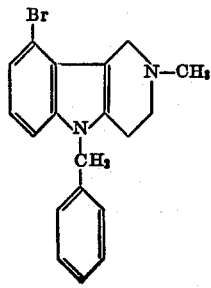

(XXII)

After reacting the N-benzyl-N-3-bromophenylhydrazine with N-methyl-4-piperidone hydrochloride of Example 13 and removal of the desired end product of that example, a naphthalene-1,5-disulfonate of melting point about 303° C., is obtained from the remaining ethanol solution, which is still acid, by precipitating with a methanolic solution of naphthalene-1,5-disulfonate in a yield of about 10–20 percent of theoretical. The compound, upon analysis also yields values corresponding to $2C_{19}H_{19}N_2Br \cdot C_{10}H_3O_6S_2$ and is believed to be the naphthalene-1,5-disulfonate of the 2 N - methyl-9-bromo-5-N-benzyl-1,2,3,4-tetrahydro-γ-carboline.

Although each of the compounds above described is chemotherapeutically useful as a histamine antagonistic substance, certain of these compounds have been found to be so outstandingly effective for the purpose intended, as to merit particular attention. These compounds are, 2 - N - methyl-7-chlor-5-benzyl - 1,2,3,4-tetrahydro - γ-carboline (Example 1), 2-N-methyl-9-chloro-5-N-benzyl-1,2,3,4-tetrahydro-γ-carboline (Example 2), 2-N-methyl-5-N-benzyl-1,2,3,4-tetrahydro-γ-carboline (Example 3), 2 - N-methyl-8-chloro-5-N - (para-chlorobenzyl) - 1,2,3,4-tetrahydro-γ-carboline (Example 4) and 2-N-methyl-5-N-(n-butyl)-1,2,3,4-tetrahydro-γ-carboline (Example 5).

This application is a continuation-in-part of my copending U. S. application, Serial No. 283,990, entitled "Chemical Compounds and Processes for Making Same" which was filed on April 23, 1952, now abandoned.

Having thus described the subject matter of this invention, what it is desired to secure by Letters Patent is:

1. A chemical compound represented by the formula:

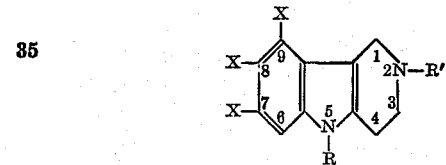

wherein X is hydrogen, or hydrogen and a halogen atom in at least one position; R is a member selected from the group consisting of lower alkyl, lower alkylaminoalkyl, benzyl, pyridylmethyl and phenyl radicals; and R' is of the group consisting of hydrogen and lower alkyl radicals.

2. The chemical compound as claimed in claim 1 wherein X in the 7 position is chlorine, R is a benzyl group and R' is a methyl group.

3. The chemical compound as claimed in claim 1 wherein X in the 9 position is chlorine, R is a benzyl group and R' is a methyl group.

4. The chemical compound as claimed in claim 1 wherein X is hydrogen, R is a benzyl group and R' is a methyl group.

5. The chemical compound as claimed in claim 1 wherein X in the 8 position is chlorine, R is a parachlorobenzyl group and R' is a methyl group.

6. The chemical compound as claimed in claim 1 wherein X in the 7 position is chlorine, R is a parachlorobenzyl group, and R' is a methyl group.

References Cited in the file of this patent

UNITED STATES PATENTS

| | | |
|---|---|---|
| 2,642,438 | Duschinsky | June 16, 1953 |
| 2,688,022 | Burtner | Aug. 31, 1954 |

OTHER REFERENCES

Withop: JACS 75: 3361–70 (1953), Chem. Abst. 47: 12404a.

Boehelheide et al.: JACS 72: 2132–4 (1950), Chem. Abst. 45: 1598b.

Eiter et al.: Monatsch. 81: 404–13, Chem. Abst. 44: 8921h.

Manske: Can. J. Research 5: 592–600 (1931), Chem. Abst. 26: 725f.